Dec. 28, 1926.

Re. 16,513

J. A. STREUN

COTTON HULL EXTRACTING MACHINE

Original Filed Jan. 2, 1924. 4 Sheets-Sheet 1

John A. Streun Inventor

By Jesse R. Stone

Attorney

Dec. 28, 1926. Re. 16,513

J. A. STREUN

COTTON HULL EXTRACTING MACHINE

Original Filed Jan. 2, 1924 4 Sheets-Sheet 2

John A. Streun Inventor

By Jesse R. Stone

Attorney

Dec. 28, 1926.

Re. 16,513

J. A. STREUN

COTTON HULL EXTRACTING MACHINE

Original Filed Jan. 2, 1924 4 Sheets-Sheet 3

John A. Streun Inventor

By Jesse R. Stone

Attorney

Dec. 28, 1926.

Re. 16,513

J. A. STREUN.

COTTON HULL EXTRACTING MACHINE

Original Filed Jan. 2. 1924 4 Sheets-Sheet 4

John A. Streun Inventor

By Jesse R. Stone

Attorney

Reissued Dec. 28, 1926. Re. 16,513

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS.

COTTON-HULL-EXTRACTING MACHINE.

Original No. 1,510,069, dated September 30, 1924, Serial No. 683,862, filed January 2, 1924. Application for reissue filed September 20, 1926. Serial No. 136,691.

My invention relates to cotton cleaning devices, and more particularly to machines for extracting hulls and trash from dirty cotton before said cotton is fed to the gin for separating the lint from the seed.

It is an object of the invention to provide a cotton hulling machine wherein the cotton may be fed through the same in even, well regulated quantities.

Another object is to provide a machine wherein the bolls and hulls are broken up and thoroughly separated from the said cotton.

Figure 1:
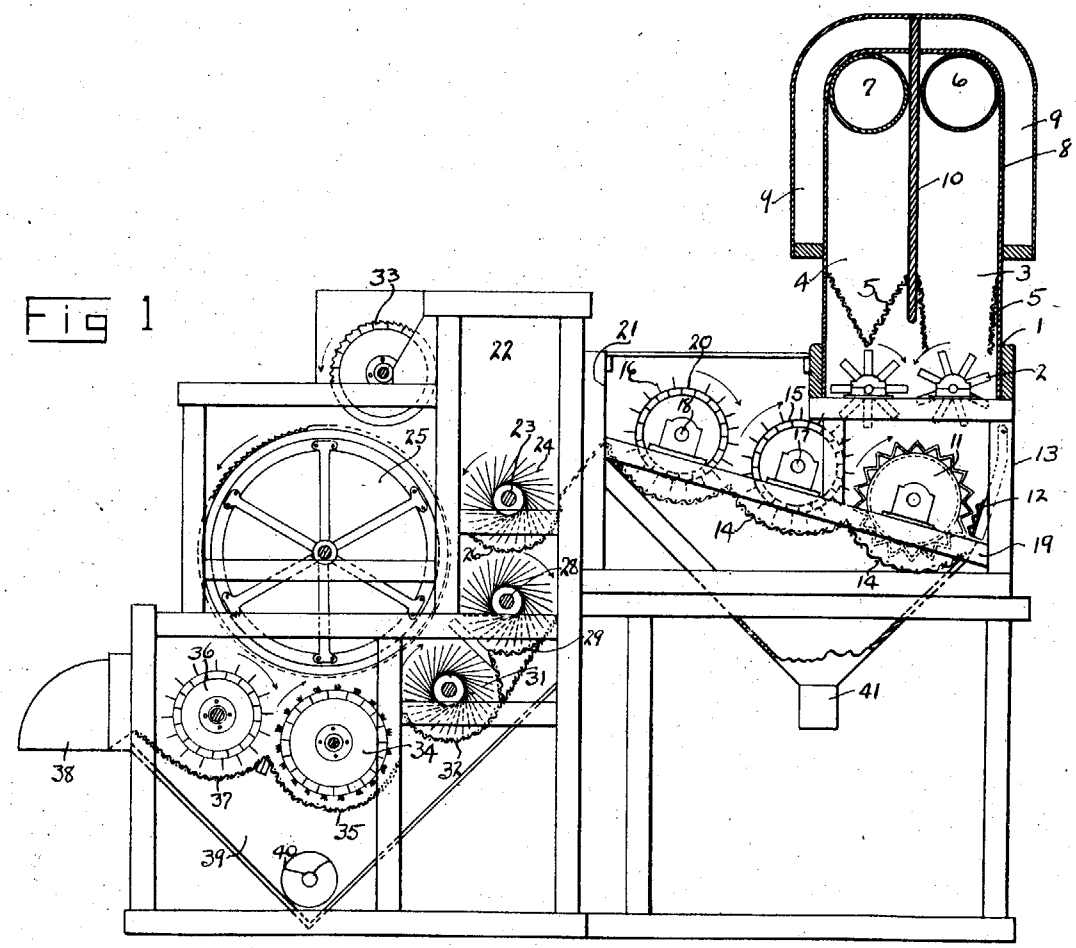
Figure 3:
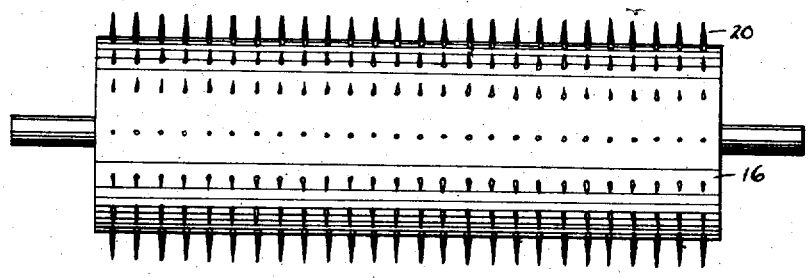
Figure 2:
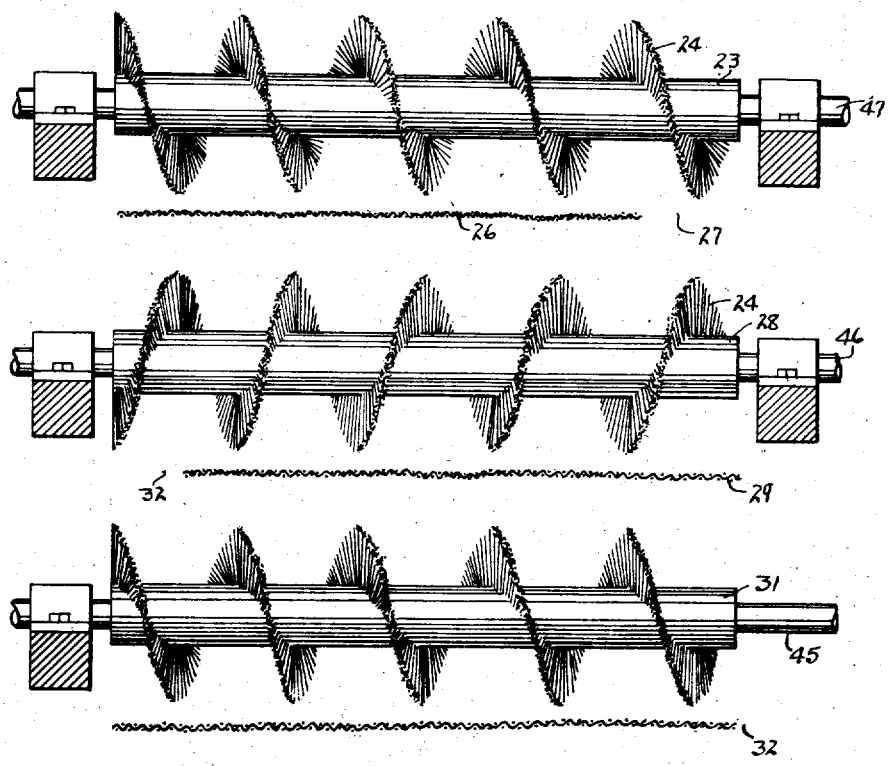
Figure 4:
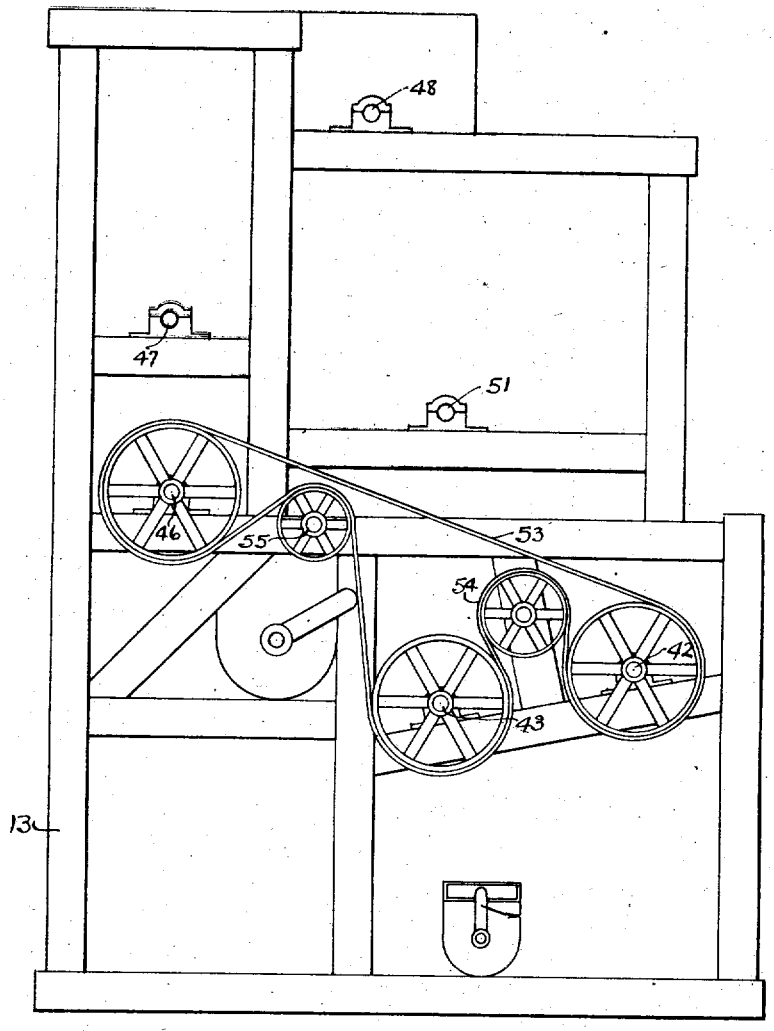
Figure 5:
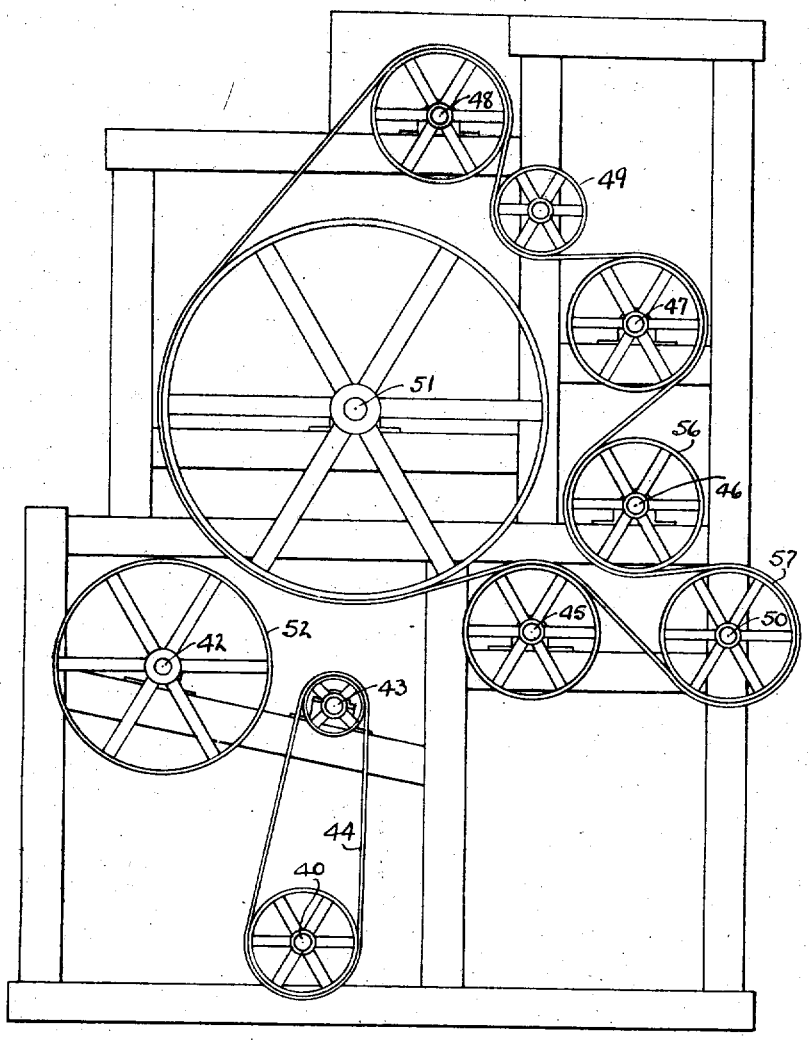

In the drawing herewith forming a part of this specification and wherein like numerals of reference are employed to designate like parts in all the views: Fig. 1 is a side elevational view showing the side of the casing of the machine removed. Fig. 2 is a broken detail, somewhat enlarged, of the conveyor rolls which feed the hulls along the saw cylinder. Fig. 3 is a front elevation of one of the picker rolls. Figs. 4 and 5 are side elevations of the cleaner with the feeder portion removed.

In the proper cleaning of seed cotton for the gin it is necessary that the cotton be fed to the cleaning device evenly so that it may be most efficiently disposed of. I have devised for this purpose an apparatus properly mounted including a hopper 1 having therein two feeder rolls 2 rotatable in opposite directions to draw the cotton down between them.

Cotton is fed to these rolls from two separate chutes 3 and 4. Each chute has a canvas valve 5 at the lower end thereof. Cotton is discharged into the chutes 3 and 4 from cotton pipes 6 and 7 respectively. To draw the cotton into said pipes the outer side of each chute is provided with a screen wall 8 leading to an air chamber 9. The said air chambers and also the chutes 3 and 4 are separated by a partition 10; but each air chamber is connected by means, not shown, to a suction fan, and an automatic valve is arranged to connect either of said air chambers, but not both at once to the suction device.

Cotton passing from the feed rollers 2 is received on a corrugated breaker roll 11 mounted to rotate in the direction of the arrow. A stationary corrugated plate or concave 12 is secured to the frame 13 of the device and is spaced from the roller 11 sufficiently to allow cotton to pass but bolls and large hulls are broken up as the breaker roll carries the cotton around past the concave toward the screen 14 below said roll.

Beyond the breaker roll are two picker rolls 15 and 16 mounted in bearings 17 and 18 on the upwardly inclined support 19. These rolls have radial spikes 20 and rotate in the same direction as the breaker roll. Each has a lower concave screen 14 spaced slightly away from the path of the spikes on said rolls. These rolls shake up the cotton and carry it across said screens which allow the dirt and trash to pass through to the dirt discharge spout 41.

The picker rolls discharge the cotton through the opening 21 into the cleaning and distributing chamber 22. The cotton is received upon a rapidly rotating conveyor roll 23. This roll has spirally arranged spikes 24 thereon which act to convey the cotton longitudinally across the face of a large saw cylinder 25 directly adjacent thereto. Beneath the conveyor 23 is a screen trough 26 along which the hulls are carried by the conveyor to one end thereof where an opening at 27 allows the hulls to drop down on to a second conveyor roll 28 the spikes 24 on which move the same to the opposite end of the saw cylinder along a screen trough 29 to the opening 30 through which the hulls are discharged onto the third conveyor roll 31 below and slightly forward from roll 28 so as to be spaced close to the saw cylinder. This conveyor roll carries the cotton hulls back along the face of the saw cylinder and on the screen trough 32 to the opposite end of the saw cylinder where said hulls may be discharged from the machine through an opening in the outer casing.

The cotton fed to the saw cylinder 25 is carried upwardly over the cylinder. Above the cylinder is a stripper roll 33 having projecting flights or teeth thereon to strike the hulls caught in the cotton and throw it back on to the conveyor rolls. The said stripper roll is journalled in the frame above the saw cylinder and rotates in the same direction as said cylinder.

Cotton is carried on around by the saw cylinder to the brush roll 34 directly below the saw cylinder. The brush removes the cotton from the saw teeth carrying it down over screen 35 to the picker roll 36 forwardly from the brush roll which carries it over screen 37 and discharges it through the outlet chute 38 ready for the gin.

Dirt and trash passing through the screens 29, 32, 35 and 37 fall into the dirt chamber 39 where they are carried by conveyor 40 from the machine.

The means by which the rolls and cylinder of the cleaner portion of the apparatus is operated is shown in Figs. 4 and 5. The pulley 52 on the shaft 42 of roll 36 is connected to some source of power. This shaft has on its opposite end a pulley connected by a belt 53 to the shafts 43 of rolls 34 and 46 of roll 28 by way of two idle pulleys 54 and 55. The shaft 46 of the roll 28 has on its opposite end a pulley 56 which is operatively connected by means of belt 57 to actuate the shafts 45 of roll 31, 47 of roll 23, 48 of roll 33, and 51 of cylinder 25. The conveyor 40 is operated from shaft 43 through belt 44. The pulleys are arranged in size to give the desired speed and direction of rotation in an obvious manner.

In the operation of my device, the suction may be turned on to air chamber adjacent the chute 4 first. This will close the canvas valve 5 thereon and draw cotton in through pipe 7 filling the chute above the valve. When this chute is full, the suction is switched from chute 4 to chute 3 allowing the valve of chute 4 to open and the valve 5 of chute 3 to close drawing cotton in through cotton pipe 6 filling chute 3 as chute 4 is discharging. Thus the chutes are filled alternately and while one is being filled the other is being discharged, thereby assuring an even and constant supply to the feed rollers 2 across the entire width of the machine.

The bolls of cotton fed from the rollers 2 on the breaker roll 11 are broken up in their passage by the concave 12, thus delivering the cotton in shape to be cleaned to the adjacent picker rolls 15 and 16. These rolls carry the cotton over the screens 14 and also agitate the cotton and break it up so that the dirt and trash is shaken out through the screen 14, falling down through the spout 41 to the trash pile. The cotton is delivered in a continuous bat to the rapidly rotating conveyor roll 23 which rotates in such direction as to move the cotton against the rotating face of the saw cylinder 25 which engages the lint of the cotton and pulls the cotton away from the hulls. Any portion of the hulls remaining on the cotton is engaged by the plates upon the stripper roll 33 and thrown back on to the conveyor cylinder which moves the hulls to the end of the screen troughs 26 discharging it on to the rolls 28 and again to roll 31. These rolls are all arranged as shown in Fig. 2 so as to continuously carry the hulls across the face of the saw cylinder so that all of the lint may be removed from the hulls which are finally discharged by the conveyor roll 31 from the casing of the machine. The cotton passing around the saw cylinder is removed by the brush roll and carried over the screen 35 to the picker roll 36 which throws it from the outlet chute 38.

The use of this device assures a rapid and continuous flow of cotton from the machine to the gin, and cotton so treated is free from hulls to such extent that the gin is able to handle much larger quantities of the cotton than when the hulls still remain therein, and the cotton is removed from the hulls in a much more efficient manner than could be accomplished where the ordinary cleaner is used and the hulls have to be separated from the cotton at the gin breast.

It not only efficiently separates the hulls and chaff from the cotton, but delivers the clean cotton in a smooth, even flow whereby it may be much more efficiently handled by the gin.

Having thus described my invention, what I claim as new and desire to protect by Letters Patent is:

1. A cotton hulling device comprising feeder rolls, a corrugated breaker roll below said feeder rolls, adjacent picker rolls, and screens below said rolls in combination with a saw cylinder of large diameter, conveyor rolls adapted to receive cotton from said picker rolls and to feed the cotton back and forth across said saw cylinder, troughs below said conveyor rolls, a stripper roll above said saw cylinder, a brush roll below said saw cylinder, and a discharge cylinder adjacent said brush roll.

2. A cotton hulling device including feeder rollers, means to deliver a continuous flow to said rollers throughout their length, means to break up bolls and agitate said cotton, a saw cylinder, a series of conveyor rolls to receive said cotton, and move it longitudinally of said saw cylinder to remove the cotton from the hulls, means to keep the hulls from passing said cylinder, a brush roll below said cylinder, a picker roll adapted to receive cotton from said brush roll and discharge it from said casing and screen beneath each of said rolls for the purpose stated.

3. A cotton hulling device comprising a pair of feeding rollers, two valve controlled chutes adapted to discharge cotton alternately to said rollers, means to fill the said chutes alternately, means below said feeder rolls to break up bolls and agitate the cotton, a saw cylinder, conveyor rolls closely adjacent said saw cylinder arranged to carry said cotton repeatedly across the length of said cylinder and to discharge the hulls at the end of the lowest of said conveyor rolls, means to remove said cotton from the cylinder and separate means to discharge said cotton from the machine.

4. A cotton cleaner comprising a breaker roll, means to feed cotton continuously to said roll, a picker roll arranged parallel with and somewhat higher than said breaker roll, screen beneath said rolls, a saw cylinder, rapidly rotating conveyor rolls closely adjacent said saw cylinder, troughs below said conveyors, said conveyors and troughs arranged to move the cotton and hulls from one end to the other of said cylinder and back again, a stripper roll, a brush roll and a discharge roll all arranged adjacent said saw cylinder in the manner specified.

5. In a cotton hull extractor, a set of feeding rollers, two cotton chutes above said rolls, means to discharge cotton evenly and continuously from said chutes alternately, breaker and agitator rolls mounted on an upwardly inclined support, a saw cylinder, conveyor rolls having troughs below them arranged adjacent said saw cylinder to carry hulls and cotton across said cylinder and discharge the hulls from the lowest of said conveyors, means to remove the cotton from said cylinder and means to discharge said cotton.

6. In a cotton hull extractor, a saw cylinder, a set of conveyor rolls arranged in stepped relation closely adjacent said saw cylinder, troughs below each conveyor, the upper trough being open at one end, the next one open at the opposite end and the lowest trough being adapted to discharge from the extractor, a stripper roll above said cylinder, a brush roll, and a discharge roll beneath said saw cylinder in the manner stated.

7. In a cotton hull extractor a saw cylinder, conveyor rolls adjacent thereto arranged to carry hulls and cotton longitudinally across the face of said cylinder, means to prevent hulls from being carried away from said conveyors by said cylinder, separate means below said saw cylinder to remove cotton from said cylinder and means to discharge said cotton from said extractor.

8. In a device of the character described, a housing having a feeding opening at the forward end thereof, a feeder roll adapted to receive said cotton and carry it transversely of the housing, a saw cylinder adjacent said feeder roll, a trough below said roll having an opening at one end, a second feeder roll below said trough adapted to receive the cotton therefrom, and convey it longitudinally of said saw cylinder, means to prevent the hulls from being carried off by said saw cylinder, means to remove the cotton from said saw cylinder, a perforate screen to the rear of said saw cylinder, and means to carry the cotton over said screen in the manner described.

9. In a device of the character described, a housing having a feeding opening adjacent the forward end thereof, a pair of superposed feeding rolls in said housing beneath said feeding opening, inclined teeth on said rolls arranged to carry the cotton longitudinally of said rolls, a saw cylinder adjacent said rolls, having teeth adapted to engage the lint on said cotton, a means to prevent hulls from passing said saw cylinder, means to remove the cotton from said cylinder and means to eliminate the dirt from said cotton.

10. In a device of the character described, a housing having a feeding opening adjacent the forward end thereof, a saw cylinder in said housing below and to the rear of said opening, a feeding roll below said opening, spirally arranged spikes on said roll to convey the cotton from said opening longitudinally of said cylinder, a second feeding roll below said first named roll, troughs below said rolls arranged to discharge cotton from the upper to the lower roll at one end and to discharge from the lower roll at the other end, a beater roll, a brush roll, and picker rolls screened to eliminate dust and dirt from said cotton.

11. In a device of the character described, a housing having a feeding opening at the front thereof, a pair of spirally toothed feeding rolls below said opening, a saw cylinder adjacent said feeding rolls, a beater roll above said cylinder arranged to prevent hulls from passing said cylinder, a brush roll to remove cotton from said cylinder, a picker cylinder arranged to discharge cotton from said housing and a screen beneath said picker cylinder for the purpose described.

12. In a device of the character described, a housing having a cotton receiving opening at one end thereof, a saw cylinder rotatable therein, means to receive cotton at one end of said cylinder and move it longitudinally of said cylinder and back again, means to prevent the hulls from passing said cylinder with said cotton, a brush roll, and a plurality of picker cylinders arranged to receive cotton from said brush roll and to eliminate the dirt from the cotton and discharge said cotton from said housing.

13. In a device of the character described a housing having a feeding opening at the forward end thereof, a saw cylinder in said housing, a rotary conveyor roll below said opening adjacent said cylinder and adapted to feed cotton longitudinally of said cylinder, a second conveyor roll below said first named roll, troughs below said rolls arranged to allow discharge of cotton from the upper to the lower conveyor roll at one end and from the lower roll at the opposite end, means to oppose the passage of hulls past said cylinder in said housing, and means to remove the cotton from said cylinder.

In testimony whereof I hereunto affix my signature this 18th day of October, A. D. 1926.

JOHN ARNOLD STREUN.